Aug. 15, 1950 A. CLARK 2,518,754
PROCESS OF SYNTHESIZING ALIPHATIC AMINES
Filed July 16, 1947
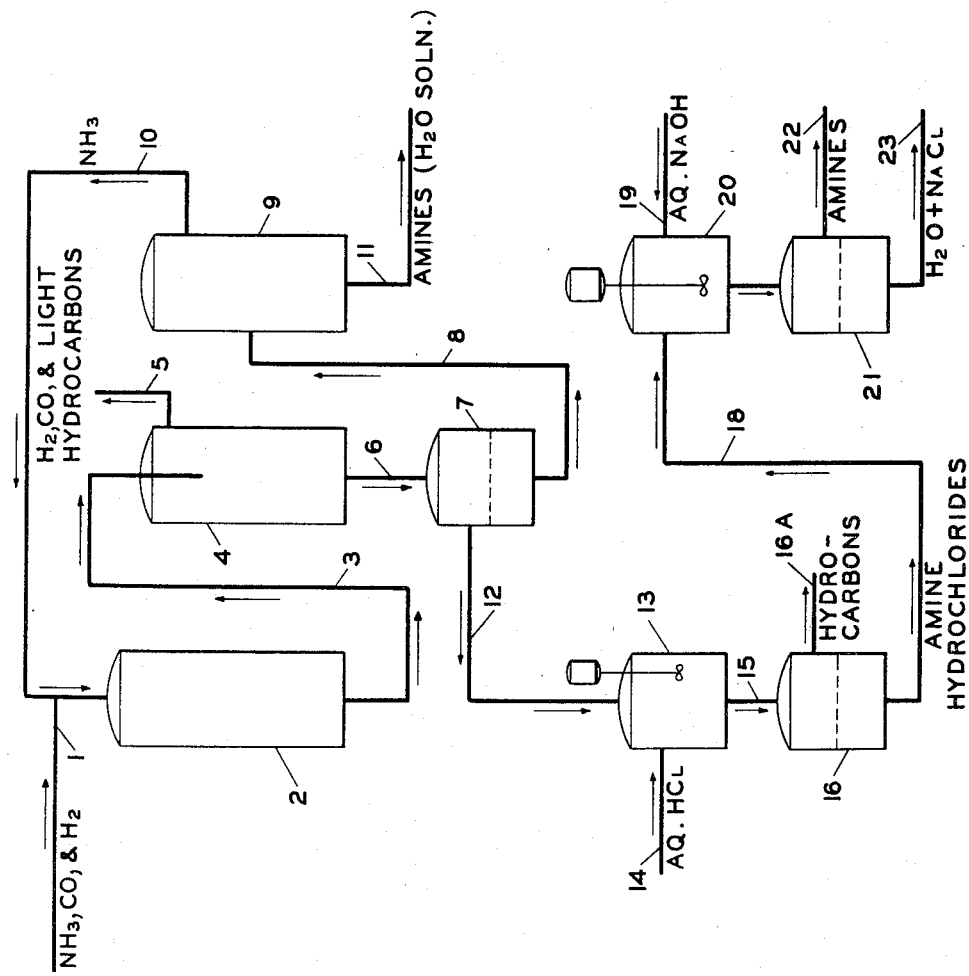
INVENTOR.
A. CLARK
BY Hudson and Young
ATTORNEYS Patented Aug. 15, 1950

2,518,754

UNITED STATES PATENT OFFICE 2,518,754

PROCESS OF SYNTHESIZING ALIPHATIC AMINES

Alfred Clark, Bartlesville, Okla., assignor to Phillips Petroleum Company, a corporation of Delaware Application July 16, 1947, Serial No. 761,293

4 Claims. (Cl. 260—585)

The present invention relates to the synthesis of hydrocarbons and aliphatic amines by the catalytic conversion of carbon monoxide-hydrogen mixtures in the presence of ammonia. In a more particular aspect the process relates to a modified Fischer-Tropsch type reaction in which ammonia is incorporated with the usual carbon-monoxide-hydrogen feed to synthesize aliphatic amines along with the hydrocarbons normally produced.

The synthesis of hydrocarbons from carbon monoxide-hydrogen mixtures is usually carried out by subjecting such mixtures, preferably in the ratio of about 2 parts of hydrogen for each part of carbon monoxide by volume, to catalytic conversion at elevated temperatures and at atmospheric or higher pressures, in the presence of such known Fischer-Tropsch catalysts as those containing iron, cobalt or nickel.

It is an object of the present invention to provide a process for the synthesis of aliphatic amines and hydrocarbons by the reduction of carbon monoxide with hydrogen. It is a further object of the invention to provide a modified Fischer-Tropsch type process in which aliphatic amines are formed by including ammonia as a component of the carbon monoxide-hydrogen synthesis gas feed.

In accordance with the present invention it has been found that by introducing ammonia as a component of the Fischer-Tropsch synthesis gas feed, aliphatic amines are formed together with the usual reaction products. These amines are principally those containing from 1 to 12 carbon atoms. These amines may be recovered as a mixed amine fraction or may be individually separated, as desired. The catalysts used are those commonly known as the Fischer-Tropsch type as generally used in carrying out the reaction of that name. These catalysts include metallic iron, sintered or otherwise, cobalt, or nickel, promoted if desired with various metal oxides as known to the art.

The ratio of ammonia to hydrogen and carbon monoxide in the feed gases may vary over a considerable range. The broad range will be between 2 and 20 mol per cent of ammonia in the feed gases. The preferable range is between 2 and 10 per cent. The ratio of hydrogen to carbon monoxide will vary depending on the catalyst employed. For nickel and cobalt catalysts the optimum ratio is two parts by volume of hydrogen to one of carbon monoxide. For iron catalysts, the optimum range is between 1.5 and 1 volumes of hydrogen per volume of carbon monoxide, and ratios as high as two volumes of hydrogen per volume of carbon monoxide can be used.

The temperatures at which this reaction may be carried out vary with the catalyst employed. For nickel and cobalt catalysts, the broad temperature range is 180° to 350° C., the preferred range being 180° to 220° C. When iron catalysts are employed, temperatures between 240° and 320° C. are normally employed, but temperatures as high as 480° C. may be employed, particularly at higher reaction pressures in excess of approximately 50 atmospheres.

As the reaction pressure is increased, the percentage of oxygenated organic products formed in the absence of ammonia increases rapidly. In the presence of ammonia, these oxygenated products react efficiently with the ammonia to form amines. Among the oxygenated compounds formed, alcohols predominate and these are especially suitable for interaction with ammonia. However, the presence of oxygenated intermediate products of reaction are not essential to the production of amines. Pressures may vary from atmospheric to as high as 200 atmospheres. With nickel catalysts pressures should preferably be maintained below 5 atmospheres in order to prevent excessive formation of nickel carbonyl. Cobalt catalysts are preferably used in the range of 1 to 20 atmospheres to increase the proportion of intermediate oxygenated compounds formed which efficiently react with ammonia to form amines. Iron catalysts may be advantageously used at pressures up to 200 atmospheres.

Various promoters may be effectively used with cobalt, iron and nickel catalysts. Thoria, for example, is a suitable promoter for both cobalt and nickel catalysts. Manganese and alumina may also be used as promoters for cobalt and nickel catalysts. Copper is an effective promoter for both iron and cobalt catalysts. Alkali, preferably added in the form of potassium carbonate, is an especially effective promoter for iron catalysts for use at high pressures (150–200 atm.) and high temperatures (440–480° C.).

Space velocities ranging from 70 to 300 volumes of mixed feed gas per volume of catalyst space per hour may be used. Effluent gas may be recycled at rates up to 100 times the rate of feed of fresh gases if desired.

The ammonia may be introduced at spaced points throughout the length of the catalyst chamber.

The nitrogen-containing products consist essentially of aliphatic monoamines corresponding to the general formulas $R_1NH_2$,

and

where $R_1$, $R_2$ and $R_3$ are alkyl groups which may be identical or different. The primary monoamines predominate.

The accompanying drawing illustrates a typical manner in which this invention may be operated.

Ammonia, hydrogen, and carbon monoxide are introduced into reactor 2 through line 1. Reactor 2 may be of any type suitable for conducting Fischer-Tropsch type reactions. The total effluent passes through line 3 into a water-spray cooler 4 where all but fixed gases and light condensible hydrocarbons ($C_3$, $C_4$ etc.) are condensed. Unconverted hydrogen and carbon monoxide are separated through line 5 along with uncondensed hydrocarbons and pass on to suitable recovery equipment. Liquid effluent is removed continuously through line 6 into a settling vessel, 7, where two layers are formed. The upper layer consists of hydrocarbons and amines, the lower layer consists of water-soluble amines, unreacted ammonia, ammonium carbonate and water. The lower layer passes through line 8 to a fractionating tower 9 where ammonia is taken off overhead and recycled to the reactor through line 10. The bottoms from the fractionator consist essentially of a water solution of amines and are removed through line 11 to subsequent separation steps. The upper layer from vessel 7 consisting of a solution of amines in hydrocarbons is pumped through line 12 to vessel 13, equipped with an efficient agitator. Aqueous hydrogen chloride is added by means of line 14. The mixture of water, amine hydrochlorides and hydrocarbons passes through line 15 to settler 16 where hydrocarbons are removed as the upper layer through outlet 16A and a water solution of amine hydrochlorides is removed through line 18 to a stirred agitator 20. Aqueous sodium hydroxide is added to the agitator through line 19. The mixture is pumped to settler 21 where amines are separated as the top layer and a water solution of sodium chloride as the bottom layer. The amines pass through line 22 to appropriate fractionation equipment. The water solution of sodium chloride is withdrawn through outlet 23.

The following examples describe the practice of the invention:

Example I

A synthesis gas comprising 15.6 mol per cent ammonia, 52.4 mol per cent hydrogen, 25.6 mol per cent carbon monoxide, 2.5 mol per cent nitrogen and small amounts of methane, carbon dioxide and oxygen was contacted with a cobalt-thoria-kieselguhr catalyst containing 100 parts cobalt, 18 parts thoria and 100 parts kieselguhr, under the following conditions: space velocity, 70–140 vol./vol. of catalyst/hr.; pressure, 150 p. s. i. g.; temperature, 182–221° C. The effluent was passed through an ice trap and then through a trap cooled by solid carbon dioxide. The materials condensed in the traps contained a mixture of primary aliphatic amines and hydrocarbons. The material collected in the ice trap contained ammonium carbonate. No nitrogen compounds were found in the wax produced.

Example II

Synthesis gas having the same composition as that in Example I was contacted with an iron catalyst containing one half per cent potassium oxide and one and one half per cent aluminum oxide. The catalyst had been prepared by reducing magnetic iron oxide with hydrogen at 450° C. for 48 hours. The operating conditions were as follows: space velocity, 100–140 vol./vol. of catalyst/hr.; pressure, 150 p. s. i. g.; temperature, 282–326° C. The effluent was processed as described in Example I. The results were similar to those in Example I, the chief exception being that small amounts of organic nitrogen compounds were found in the wax fraction.

Ammonium carbonate is formed in substantial quantities as a by-product of the process. This may be separated for use or sale as such, but may also be readily decomposed to form ammonia which is recycled to the process.

I claim:
1. A process for the synthesis of aliphatic amines which comprises contacting a gaseous mixture containing two to twenty mol per cent ammonia and hydrogen and carbon monoxide in a volume ratio of 2:1 to 1:1 with a hydrogenation catalyst containing no metallic catalyst other than iron at a temperature of 240 to 320° C. and at a pressure of atmospheric to 200 atmospheres, and separating aliphatic amines containing from one to twelve carbon atoms per molecule as reaction products.

2. A process according to claim 8 wherein the iron catalyst is promoted with potassium oxide and aluminum oxide.

3. A process for the synthesis of hydrocarbons and aliphatic amines which comprises forming a mixture containing two to twenty mol per cent ammonia and hydrogen and carbon monoxide in a volume ratio of 2:1 to 1:1, contacting said mixture with a hydrogenation catalyst containing no metallic catalyst other than iron and promoted with potassium oxide and aluminum oxide at a temperature of 240 to 320° C., contacting the products of reaction with water to separate water-soluble reaction products and liquid products from gaseous hydrocarbons formed and unreacted material, separating the water solution from the liquid hydrocarbon fraction and recovering water-soluble amines from said water solution, contacting the liquid hydrocarbon fraction containing amines dissolved therein with hydrogen chloride to form amine hydrochlorides, separating said amine hydrochlorides from the liquid hydrocarbons, neutralizing the hydrochlorides with alkali to liberate the amines, and separately recovering said amines and said liquid hydrocarbons.

4. A process according to claim 3 wherein ammonium carbonate is formed as a product of the reaction and wherein the ammonium carbonate is recovered and decomposed to liberate ammonia which is recycled to the reaction zone.

ALFRED CLARK.

REFERENCES CITED

The following references are of record in the file of this patent:

UNITED STATES PATENTS

| Number | Name | Date |
|---|---|---|
| 1,904,218 | Franceway | Apr. 18, 1933 |
| 1,909,442 | Williams | May 16, 1933 |
| 2,287,891 | Linckh | June 30, 1942 |
| 2,417,893 | Teter | Mar. 25, 1947 |
| 2,422,631 | Olin et al. | June 17, 1947 |
| 2,422,632 | Olin et al. | June 17, 1947 |

OTHER REFERENCES

Ephraim: "Inorganic Chemistry" (Interscience Publishers, Inc., N. Y., 4th ed., 1943), page 810.